(12) United States Patent
Gladigau et al.

(10) Patent No.: US 10,671,396 B2
(45) Date of Patent: Jun. 2, 2020

(54) METHOD FOR OPERATING A PROCESSING UNIT

(71) Applicant: Robert Bosch GmbH, Stuttgart (DE)

(72) Inventors: Jens Gladigau, Renningen (DE); Dirk Ziegenbein, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/309,573

(22) PCT Filed: May 31, 2017

(86) PCT No.: PCT/EP2017/063106
§ 371 (c)(1),
(2) Date: Dec. 13, 2018

(87) PCT Pub. No.: WO2017/215913
PCT Pub. Date: Dec. 21, 2017

(65) Prior Publication Data
US 2019/0258488 A1    Aug. 22, 2019

(30) Foreign Application Priority Data

Jun. 14, 2016 (DE) .................. 10 2016 210 535
Jun. 24, 2016 (DE) .................. 10 2016 211 386

(51) Int. Cl.
*G06F 12/00* (2006.01)
*G06F 9/46* (2006.01)
(Continued)

(52) U.S. Cl.
CPC .............. *G06F 9/3836* (2013.01); *G06F 8/75* (2013.01); *G06F 9/44521* (2013.01);
(Continued)

(58) Field of Classification Search
CPC .. G06F 9/3016; G06F 9/3001; G06F 9/30029; G06F 9/30189; G06F 9/30098;
(Continued)

(56) References Cited

U.S. PATENT DOCUMENTS 5,072,418 A * 12/1991 Boutaud ........ G01R 31/318536
708/207
6,038,641 A *  3/2000 Zangenehpour .... G06F 12/0866
711/119

(Continued)

FOREIGN PATENT DOCUMENTS

| JP | 2002073113 A | 3/2002 |
|----|--------------|--------|
| JP | 2009211540 A | 9/2009 |
| WO | 2015082109 A1 | 6/2015 |

OTHER PUBLICATIONS

Jakob Puchinger et al., Automating Branch-and-Bound for Dynamic Programs, Jan. 7-8, 2008, [Retrieved on Feb. 27, 2020]. Retrieved from the internet: <URL: https://dl.acm.org/doi/pdf/10.1145/1328408.1328421?download=true> 9 Pages (81-89) (Year: 2008).*

(Continued)

*Primary Examiner* — Anibal Rivera
(74) *Attorney, Agent, or Firm* — Norton Rose Fulbright US LLP; Gerard Messina

(57) ABSTRACT

A method for operating a processing unit, including a memory and at least one processor core that executes a plurality of program functions of a computer program, includes ascertaining all program instructions that belong to a program function to be executed at a future execution point in time and providing the ascertained program instructions in the memory before the execution point in time.

24 Claims, 5 Drawing Sheets

(51) Int. Cl.

| | | |
|---|---|---|
| *G06F 9/30* | (2018.01) | |
| *G06F 9/38* | (2018.01) | |
| *G06F 8/75* | (2018.01) | |
| *G06F 9/445* | (2018.01) | |
| G06F 9/48 | (2006.01) | |
| G06F 12/0862 | (2016.01) | |
| G06F 13/28 | (2006.01) | |
| G06F 9/52 | (2006.01) | |
| G06F 9/345 | (2018.01) | |

(52) U.S. Cl.
CPC .......... *G06F 9/3001* (2013.01); *G06F 9/3016* (2013.01); *G06F 9/30098* (2013.01); *G06F 9/3455* (2013.01); *G06F 9/4881* (2013.01); *G06F 9/526* (2013.01); *G06F 12/0862* (2013.01); *G06F 13/28* (2013.01); *G06F 2212/452* (2013.01)

(58) Field of Classification Search
CPC .. G06F 9/30043; G06F 9/3005; G06F 9/3455; G06F 9/485; G06F 9/526; G06F 9/455; G06F 17/5009; G06F 21/10; G06F 21/575; G06F 8/4442; G06F 8/452; G06F 9/3836; G06F 9/44521; G06F 9/4881; G06F 12/0862; G06F 2212/452
See application file for complete search history.

(56) References Cited

U.S. PATENT DOCUMENTS

| | | | | |
|---|---|---|---|---|
| 6,055,619 | A * | 4/2000 | North | G10H 7/002 704/270 |
| 6,441,917 | B1 * | 8/2002 | Ikeda | G06F 5/065 358/1.16 |
| 6,658,578 | B1 * | 12/2003 | Laurenti | G06F 5/01 712/244 |
| 7,526,632 | B1 * | 4/2009 | Rupp | G06F 9/30003 712/43 |
| 7,533,154 | B1 * | 5/2009 | Chen | H04L 47/6215 709/213 |
| 8,738,860 | B1 * | 5/2014 | Griffin | G06F 12/0831 711/122 |
| 9,015,689 | B2 * | 4/2015 | Bai | G06F 8/433 717/157 |
| 9,432,298 | B1 * | 8/2016 | Smith | H04L 49/9057 |
| 10,007,520 | B1 * | 6/2018 | Ross | G06F 9/30174 |
| 10,049,037 | B2 * | 8/2018 | Scaramuzzo | G06F 12/0246 |
| 2002/0026543 | A1 * | 2/2002 | Tojima | G06F 13/30 710/22 |
| 2003/0084433 | A1 * | 5/2003 | Luk | G06F 8/4442 717/158 |
| 2003/0131173 | A1 * | 7/2003 | Cassidy | G06F 13/4221 710/308 |
| 2003/0154246 | A1 * | 8/2003 | Ollikainen | H04N 21/2182 709/203 |
| 2004/0243740 | A1 * | 12/2004 | Yamagishi | G06F 13/28 710/22 |
| 2005/0172067 | A1 * | 8/2005 | Sinclair | G06F 3/0613 711/103 |
| 2006/0090063 | A1 * | 4/2006 | Theis | G06F 8/4451 712/239 |
| 2007/0083735 | A1 * | 4/2007 | Glew | G06F 9/3012 712/214 |
| 2007/0118696 | A1 * | 5/2007 | McCauley | G06F 12/0862 711/137 |
| 2007/0121499 | A1 * | 5/2007 | Pal | H04L 45/60 370/230 |
| 2007/0124732 | A1 * | 5/2007 | Lia | G06F 9/485 718/102 |
| 2007/0294496 | A1 * | 12/2007 | Goss | G06F 12/1408 711/163 |
| 2008/0133868 | A1 * | 6/2008 | Glew | G06F 9/3012 711/171 |
| 2008/0133889 | A1 * | 6/2008 | Glew | G06F 9/3012 712/214 |
| 2008/0133893 | A1 * | 6/2008 | Glew | G06F 9/3012 712/220 |
| 2008/0162753 | A1 * | 7/2008 | Liu | G06F 13/385 710/74 |
| 2008/0256316 | A1 * | 10/2008 | Evanchik | G06F 9/4418 711/162 |
| 2008/0320243 | A1 * | 12/2008 | Mitsuzuka | G06F 15/167 711/153 |
| 2009/0019262 | A1 * | 1/2009 | Tashiro | G06F 9/3016 712/208 |
| 2009/0125647 | A1 * | 5/2009 | Shasha | G06F 13/28 710/22 |
| 2009/0144589 | A1 * | 6/2009 | Shasha | G06F 13/28 714/56 |
| 2009/0168525 | A1 * | 7/2009 | Olbrich | G06F 13/1657 365/185.11 |
| 2009/0216917 | A1 * | 8/2009 | Shasha | G06F 13/30 710/25 |
| 2009/0259801 | A1 * | 10/2009 | Kilzer | G06F 12/0246 711/103 |
| 2009/0287903 | A1 * | 11/2009 | Hsu | G06F 8/4442 711/213 |
| 2010/0011446 | A1 * | 1/2010 | Klucher | G06F 21/10 726/27 |
| 2010/0174876 | A1 * | 7/2010 | Kasahara | G06F 8/453 711/154 |
| 2011/0106934 | A1 * | 5/2011 | Sadasivan | H04L 41/00 709/223 |
| 2011/0185125 | A1 * | 7/2011 | Jain | G06F 12/0811 711/122 |
| 2011/0219208 | A1 * | 9/2011 | Asaad | G06F 15/76 712/12 |
| 2012/0066458 | A1 * | 3/2012 | Chiba | G06F 3/0611 711/154 |
| 2012/0173772 | A1 * | 7/2012 | Durand | G06F 13/28 710/22 |
| 2012/0254888 | A1 * | 10/2012 | Kalogeropulos | G06F 8/452 718/107 |
| 2013/0191693 | A1 * | 7/2013 | Ross | G06F 11/0745 714/45 |
| 2013/0246748 | A1 * | 9/2013 | Farrell | G06F 9/3005 712/205 |
| 2013/0275835 | A1 * | 10/2013 | Aswadhati | G06F 11/1068 714/773 |
| 2013/0283019 | A1 * | 10/2013 | Ould-Ahmed-Vall | G06F 9/30181 712/225 |
| 2014/0214754 | A1 * | 7/2014 | Li | G06F 16/24524 707/603 |
| 2014/0282454 | A1 * | 9/2014 | Bai | G06F 8/433 717/157 |
| 2016/0004639 | A1 * | 1/2016 | Vorbach | G06F 9/526 711/122 |
| 2016/0098279 | A1 * | 4/2016 | Glew | G06F 9/3012 712/239 |
| 2016/0140781 | A1 * | 5/2016 | Lang | G07C 5/08 701/33.7 |
| 2016/0150558 | A1 * | 5/2016 | Shor | H04L 45/66 370/329 |
| 2016/0188328 | A1 * | 6/2016 | Ould-Ahmed-Vall | G06F 9/30043 712/208 |
| 2016/0188329 | A1 * | 6/2016 | Ould-Ahmed-Vall | G06F 9/30098 712/208 |
| 2016/0232105 | A1 * | 8/2016 | Goss | G06F 21/575 |
| 2016/0259644 | A1 * | 9/2016 | Brandt | G06F 9/30076 |
| 2016/0283234 | A1 * | 9/2016 | Xekalakis | G06F 9/455 |
| 2016/0306922 | A1 * | 10/2016 | van Rooyen | H04L 67/10 |
| 2017/0177349 | A1 * | 6/2017 | Yount | G06F 9/30043 |
| 2017/0177404 | A1 * | 6/2017 | Drysdale | G06F 9/466 |

(56) References Cited

U.S. PATENT DOCUMENTS

2017/0329609 A1* 11/2017 Sivkov .................. G06F 9/3001
2018/0088943 A1*  3/2018 Abraham ............ G06F 9/30167
2018/0157571 A1*  6/2018 Lunstroth ........... G06F 17/5009

OTHER PUBLICATIONS

Yichen Xie et al., Saturn: A Scalable Framework for Error Detection Using Boolean Satisfiability, 2007, [Retrieved on Feb. 27, 2020]. Retrieved from the internet: <URL: https://dl.acm.org/doi/pdf/10.1145/1232420.1232423?download=true> 43 Pages (1-43) (Year: 2007).*

International Search Report dated Jul. 20, 2017 of the corresponding International Application PCT/EP2017/063106 filed May 31, 2017.

Anonymous: "Out-of-order execution—Wikipedia", Jun. 12, 2016, XPO55389445.

Leif Lindholm: "Memory access ordering—an introduction—Processors—ARM Community," Sep. 11, 2013, XPO55389447.

Anonymous: "Circular buffer—Wikipedia," Jun. 11, 2016, XPO55389817.

* cited by examiner

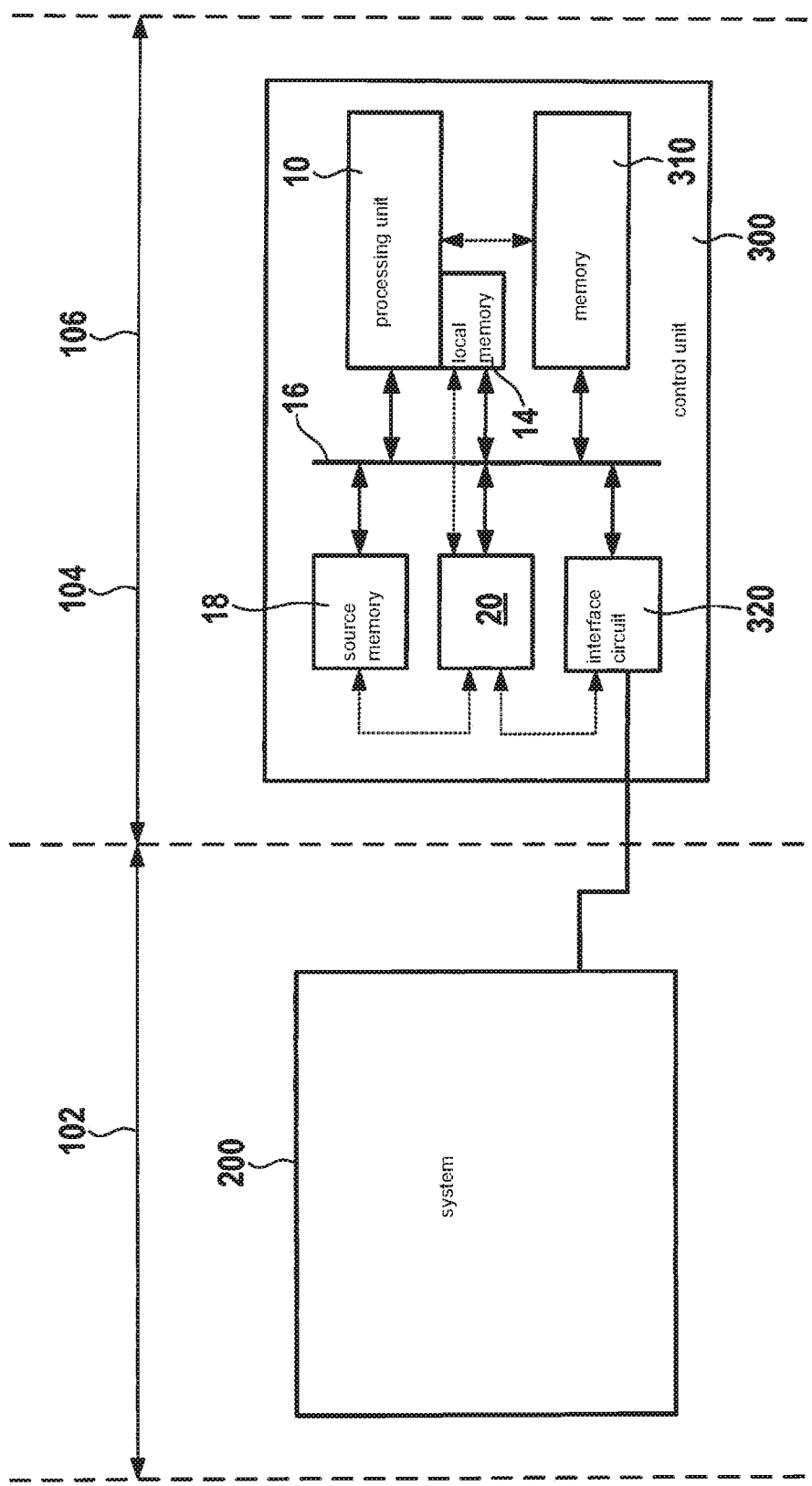

METHOD FOR OPERATING A PROCESSING UNIT

CROSS-REFERENCE TO RELATED APPLICATIONS

The present application is the national stage of International Pat. App. No. PCT/EP2017/063106 filed May 31, 2017, and claims priority under 35 U.S.C. § 119 to DE 10 2016 210 535.3, filed in the Federal Republic of Germany on Jun. 14, 2016 and to DE 10 2016 211 386.0, filed in the Federal Republic of Germany on Jun. 24, 2016, the content of each of which are incorporated herein by reference in their entireties.

FIELD OF THE INVENTION

The present invention relates to operating a processing unit that includes at least one processor core and one local memory with respect to the processing unit, a plurality of program functions of a computer program for the processing unit being executed using the at least one processor core.

BACKGROUND

Processing units, which include one or multiple processors or processor cores, which are able to read data and/or program instructions from a data memory, and are therefore able to execute a respective computer program, are known from the market.

SUMMARY

Example embodiment of the present invention are directed respectively to a method, a processing unit, a transfer unit, and/or a control and/or regulating unit. Features important for an understanding of the present invention are also found in the following description and in the drawings, where the features can be important for the present invention both alone as well as in different combinations, with no further reference being explicitly made hereto.

An example embodiment of the present invention is directed to a method for operating a processing unit, the processing unit including at least one processor core and one local memory with respect to the processing unit, a plurality of program functions of a computer program for the processing unit being executed using the at least one processor core. The method includes: ascertaining program instructions, in particular, all program instructions that belong to a program function, which is to be executed at a future execution point in time; and providing the ascertained program instructions in the local memory before the execution point in time.

Program instructions are preferably (but not necessarily) ascertained chronologically before a runtime of the computer program, as will be explained in greater detail further below.

The local memory is an internal global memory of the processing unit, for example, and/or an external memory of the processing unit, and/or a local memory of the processor core. The aforementioned memory is a RAM memory, for example, a memory with random access.

The processing unit can be an arbitrary device per se for executing a computer program, for example, a processor having components peripheral thereto, or a microcontroller, or the like.

The processing unit can be designed using a single integrated semiconductor circuit or using a plurality of integrated semiconductor circuits. The processing core is preferably a processor core.

The aforementioned computer program can include one or multiple program functions, and a respective program function can include one or multiple program instructions. In English language usage, the "program function" can optionally be characterized by the term "runnable." The program functions can include plannable program functions and/or non-plannable program functions.

The provided method can avoid waiting times in the execution of program functions or program instructions, in particular, in the case of plannable program functions, by providing the program instructions necessary for the execution in the local memory of the processor core before the execution.

In simplified terms, knowledge of each of the next program functions pending for execution is ascertained and utilized in order to provide the respectively required program instructions (optimally) in the local memory. This knowledge can be ascertained, for example, via a static planning with respect to periodic executions of program functions and/or by a program analysis (software analysis). Thus, if a sequence of particular program functions is known already before the execution, these functions can be preparatively (optimally) situated in the local memory. As a result, it is not necessary for the particular processor core to have to download program instruction by program instruction from a system memory (for example, from a so-called "flash memory" or from another memory having a higher latency than the local memory). As a result, the probability can, in particular, be advantageously reduced that a processor core could potentially execute a program function or a program instruction, but this program function or program instruction is not yet downloaded and the processor core must therefore wait. This scenario is also characterized by the term "instruction stall."

It can also be simply put that according to the method, systemic knowledge of a respective future execution can be utilized at the functional level, accordingly, preferably all program instructions belonging to a program function capable a priori of being provided. The aforementioned "systemic knowledge" corresponds, for example, to "domain-specific knowledge," for example, with respect to so-called "embedded systems" as they can be used, for example, in an engine control unit or the like.

It can further be simply put that the program instructions for predictable (in particular, for plannable) program functions can be provided in various ways. This is explained in still greater detail further below.

It can further be simply put that a prediction for executing program functions is frequently not possible for all program functions that are executed in an embedded system. These can, for example, relate to so-called "interrupt handlers" and/or library functions and/or functions of an operating system, which are potentially difficult to predict a priori and to plan in the manner described.

In an example embodiment, a mixed operation is provided for such purpose: plannable program functions are executed from the local memory and non-plannable program functions are executed in the conventional manner and, if necessary, read from a code memory having a comparatively high latency.

The present invention yields an advantage that a capacity of the processing unit or of the processor core characterizing the processing of computer programs can be increased. The capacity of a microcontroller can be increased, for example. A higher IPC, instructions per cycle, (number of executable instructions in a clock cycle), in particular, can be enabled during an execution of program functions.

Another advantage of the present invention is that a cache memory can be at least partially or at least temporarily dispensable, in particular, during an execution of plannable program functions. As a result, an efficiency of the cache memory can be increased, pieces of information available in the cache memory having to be overwritten less often (less "suppression"), for example. It can also be possible to scale a cache memory smaller, as a result of which costs can be saved. A cache memory corresponds to a comparatively fast buffer memory, which is able to avoid, for example, repeated accesses to a comparatively slow system memory or potentially required recalculations. Since the cache memory usually has a lower latency than the global memory, it is generally more expensive than the (conventional) local memory such as, for example, a local working memory. Overall, the application of the principle according to the present invention also enables the use of relatively slow and, therefore, favorable code memory (such as, for example, a flash memory), without the occurrence of the known related disadvantages (for example, instruction stalls).

In an example embodiment of the method, it is provided that the ascertained program instructions are provided in the local memory of the processing unit in a sequence as a function of the program function to be executed. This can advantageously enable an overall high efficiency in the program execution.

In an example embodiment, it is provided that, for multiple different program functions, all program instructions belonging to the relevant program function are provided in each case in the local memory before the respective execution point in time. In this way, potential delays in the processing of the program functions can be advantageously avoided.

In an example embodiment, it is provided that the local memory is a global working memory of the processing unit and/or a local working memory of the at least one processor core. In this way, a respective latency can advantageously be kept relatively low. The global working memory, for example, is designed so that it can be accessed by multiple processor cores, i.e., by at least two processor cores of the processing unit. In an example embodiment, the global memory is an external or internal RAM memory of the processing unit.

In an example embodiment, at least one ring memory ("ring buffer") is provided in the local memory for providing the ascertained program instructions, the ring memory, in particular, being cyclically read from the processing unit for program execution, and the ring memory being cyclically written with additional ascertained and chronologically following program instructions to such addresses of the ring memory that have already been read in the cycle from the processing unit. The ring memory is situated, for example, in an address space of the local memory, at least one cyclically changeable address pointer being provided in each case in order according to the method to access the ring memory. In this way, the ascertained program instructions can be particularly efficiently provided and/or executed.

For example, the processor core executes in succession the program functions to be executed from the ring memory, while another unit fills the ring memory in a suitable manner. See in this regard the transfer unit described further below. One design or organization of at least one part of the local memory as a ring memory can be particularly advantageous for the method; according to the method, however, other example embodiments or organizational forms can also be used for the local memory.

In an example embodiment, it is provided that multiple tasks are periodically executed in the processing unit, different tasks, in particular, each being assigned a different cycle time, and each task including a plurality of program functions of a computer program, which are to be executed in a predefinable sequence, and one separate ring memory being provided in each case for providing the ascertained program instructions of the different tasks. In a control and/or regulating unit for the engine control of a motor vehicle, for example, the tasks can include cycle times of 1 ms, 2 ms, 5 ms, 10 ms, etc. Accordingly, it can be advantageous to use a dedicated ring memory for each existing cycle time, as a result of which, an efficiency in operating the processing unit can be improved.

In an example embodiment, it is provided that the ascertained program instructions are provided by a transfer unit, preferably independent of the processing unit, which copies the ascertained program instructions into the local memory from a source memory. The source memory is a flash memory external to the processing unit, for example. By using the transfer unit, it is possible to advantageously accelerate the method and to relieve the respective processor core.

It can further be provided that the transfer unit includes an additional processing unit and/or an additional processor core of the processing unit, and/or a direct memory access control unit. In this way, the transfer unit can be advantageously simply and efficiently designed. In one particularly preferred example embodiment, the direct memory access control unit is designed as pure hardware circuitry. The direct memory access control unit is also referred to as a "DMA controller." Alternatively, the direct memory access control unit can be implemented using software or using a mix of hardware and software. In an example embodiment, the transfer unit is designed as special (user-specific) hardware circuitry. As a result, it can be particularly simple to use code transformations and/or a program code independent of an address position ("position independent code").

In an example embodiment, the ascertainment of all program instructions that belong to a program function includes: evaluation of a preferably static planning of a periodic execution of the program functions, and/or a software analysis of at least one part of the computer program. Thus, it is possible to advantageously ascertain from the number of program functions to be executed during an upcoming time span, in each case, program functions regularly to be executed, using a static planning using linear lists of program functions and/or to ascertain other program functions to be executed using an analysis, in particular, a software analysis. This also characterizes the systemic knowledge or domain-specific knowledge described further above.

In an example embodiment, a plurality of linear lists of program functions is ascertained, a respective list of program functions from the plurality of linear lists being selected from the plurality for processing during a runtime of the computer program or of the tasks using conditions ascertained during the runtime. The optional use of such a "quasi-static planning" can further improve the method.

In an example embodiment, at least one sequence of program functions, which are provided for execution, is ascertained during the runtime of the computer program. The aforementioned sequence can then be used for the method in a manner comparable to the linear lists described.

In an example embodiment, it is provided that the program functions include a first group, whose execution in each case is plannable for a future execution point in time, and include a second group, whose execution in each case is not plannable for a future execution point in time, the program functions of the first group being executed using the working memory organized at least partially, for example, as a ring memory, and the program functions of the second group being executed using a conventional cache memory or of a conventional code memory. In this way, the method can be advantageously adapted to respective conditions of the operation of the processing unit and/or of the computer program.

In an example embodiment, it is provided that the transfer unit is programmed at a start of the processing unit and/or during a runtime of the processing unit, in particular, in such a way that the transfer unit is able to carry out the provision of the ascertained program instructions in the local memory in a particularly required sequence before the execution point in time.

It can further be provided that the programming of the transfer unit includes in each case at least one source address and at least one destination address and a size of associated data blocks of the relevant program functions to be provided in the local memory. In this way, an operation of the transfer unit can be advantageously optimized. The data blocks include a particular number of ascertained program instructions of at least one program function. In a first variant thereof, the transfer unit is programmed and/or configured once at a start of the processing unit or of the processor core or of an embedded system. In a second variant thereof, this takes place at least once after the start, i.e., during a runtime.

It can further be provided that the transfer unit is time-controlled by a timer in order to ascertain the respective program instructions and/or in order to provide the ascertained program instructions in the local memory. A chronological sequence of the method can be improved as a result.

It can further be provided that the transfer unit is activated by the processing unit (or processor core) executing the tasks and/or by a processing unit (or processor core) differing therefrom, in order to ascertain the respective program instructions and/or in order to provide the ascertained program instructions in the local memory. This enables an advantageous control of the transfer unit. In an example embodiment, the aforementioned activation takes place using an interrupt.

It can further be provided that the transfer unit is activated as a function of a fill level of the local memory or of the ring memory and/or as a function of a system state of the processing unit or of the processor core and/or as a function of a system state of peripheral units of the processing unit or of the processor core. In this way, the local memory can be advantageously and efficiently utilized.

It can further be provided that the ascertained program instructions can be provided in the ring memory using data blocks, each of which includes exactly one program function. In this way, the method can be further improved. As previously explained above, a respective program function can include one or multiple program instructions.

It can be further provided that the program instructions can be provided in the ring memory using data blocks that have a constant size regardless of a respective program function. In this way, the method can be advantageously simplified. Such a data block, if necessary, contains more than one program function or not the entire data block contains program instructions. A transfer from program function to program function can, if necessary, be meaningful, even if these typically have different data lengths. In this case, the most suitable variant can be selected in each case, for example, as a function of a hardware architecture and/or of a bandwidth of a bus system and/or of a size of the local memory.

It can further be provided that an addressing or addresses of the program instructions to be provided in the local memory or ring memory is adapted using a compiler and/or of a linker as a function of properties of the associated program functions. In this way, the method can be carried out essentially regardless of properties of a program code.

This can advantageously take into account the fact that the ascertained program instructions in the local memory are in general not necessarily provided in an address space suitable for the respective program function. Thus, the transfer unit can preferably transfer the program instructions belonging to a (respectively specific) program function to an equally specific ("identical") address in the local memory of the executing processor core. As described, the addressing or addresses of the program instructions can then be adapted using the compiler/linker according to the planned buffering.

Alternatively or in addition to a static adaptation of the program instructions ("binary program code") using the compiler/linker, a use of a memory management unit (MMU) can be provided.

In another variant, the program functions or the program instructions are executed using a position independent code.

It can further be provided that code transformations or address transformations are carried out using the transfer unit in the program functions and/or in the program instructions to be provided in the local memory. As a result, these procedures can advantageously take place also using the transfer unit, whereby effort and costs can be saved.

In an example embodiment, program instructions are ascertained before a runtime of the computer program, in particular, at a development time ("design time") of the computer program and/or of the program system that includes the computer program, the program instructions being provided during the, if necessary, only significantly later occurring runtime of the computer program. The program instructions are ascertained preferably (but not necessarily) by a unit differing from the processing unit or by a system differing therefrom. In this way, the ascertainment of the program instructions can be advantageously separated from the provision of the program instructions. This can, in particular, be enabled in that the ascertainment of the program instructions is carried out only once, as a result of which equipment costs and/or processing effort can potentially be reduced.

An example embodiment of the present invention is directed to a processing unit, including at least one processor core and a local memory with respect to the processing unit, the processing unit being designed to execute a plurality of program functions of a computer program for the processing unit using the at least one processor core, and the processing unit being further designed to execute a method that includes: ascertaining program instructions, in particular, program instructions that belong to a program function, which is to be executed at a future execution point in time; and providing the ascertained program instructions in the local memory before the execution point in time.

In an example embodiment thereof, the local memory is a global working memory of the processing unit and/or a local working memory of the at least one processor core.

In an example embodiment thereof, the processing unit includes a transfer unit designed to carry out the provision of the ascertained program instructions in that the transfer unit copies the ascertained program instructions from a source memory into the local memory.

In an example embodiment, the transfer unit is designed to signal to the processing unit and/or to the processor core the provision of the ascertained program instructions in the local memory. In this way, a possible method step is written at the same time. It can also be provided that the transfer unit also conveys particular memory addresses of the ascertained program instructions and/or program functions in the local memory to the processing unit and/or to the processor core. In this way, an operation of the processing unit can be improved and made more reliable.

Comparable advantages result for the processing unit according to the present invention as well as for the provided embodiments thereof, as was previously described above for the method according to the present invention.

An example embodiment of the present invention is directed to a control and/or regulating unit, in particular, for a motor vehicle, the control and/or regulating unit including a processing unit according to at least one of the described embodiments. In this way, the control and/or regulation of the motor vehicle can be advantageously improved.

An example embodiment of the present invention is directed to a system for ascertaining program instructions, in particular, all program instructions that belong to a program function of a computer program, which program function is to be executed at a future execution point in time, the system being designed to carry out the ascertainment of program instructions chronologically before a runtime of the computer program, in particular, at a development time of the computer program and/or of a program system that includes the computer program. The ascertainment of the program instructions can be advantageously separated from the provision of the program instructions using the system according to the present invention. This can, in particular, enable the ascertainment of the program instructions to be carried out only once, as a result of which equipment costs and/or computing effort can potentially be reduced.

An example embodiment of the present invention is directed to a transfer unit for a or the processing unit, the processing unit including at least one processor core and a local memory with respect to the processing unit, and the processing unit being designed to execute a plurality of program functions of a computer program for the processing unit using at least one processor core. The transfer unit in this case is designed to copy program instructions, in particular, all program instructions that belong to a program function ascertained by a unit preferably independent of the transfer unit, which is to be executed by the processing unit at a future execution point of time, from a source memory into the local memory. The source memory is an external flash memory with respect to the processing unit, for example. With the transfer unit, it is possible to particularly advantageously process the computer program and to advantageously relieve the processing unit and the respective processor core.

In an example embodiment thereof, the program instructions have been ascertained using an evaluation of a preferably static planning of a periodic execution of the program functions, and/or using a software analysis of at least one part of the computer program. The transfer unit can be provided with corresponding data before the execution of the computer program on the processing unit or also dynamically, i.e., during the execution of the computer program on the processing unit. Such data can, for example, be reserved as an addition to the computer program.

In an example embodiment, the transfer unit includes a direct memory access controller and/or a processor core, for example an additional processor core of the aforementioned processing unit, and/or a hardware unit independent of the processor core and of the direct memory access controller, for example, an ASIC, ("application specific integrated circuit"), or a part thereof, or an FPGA ("field programmable gate array"), or a part thereof. The embodiments of the transfer unit have been already described in greater detail above in the method for operating the processing unit. Comparable advantages result.

Exemplary example embodiments of the present invention are explained below with reference to the drawings, in which the same reference numerals are used for functionally equivalent elements and variables in all figures, even in different example embodiments.

BRIEF DESCRIPTION OF THE DRAWINGS

FIG. 7 is a schematic diagram expanded relative to FIG. 5, according to an example embodiment of the present invention.

DETAILED DESCRIPTION

Figure 1:
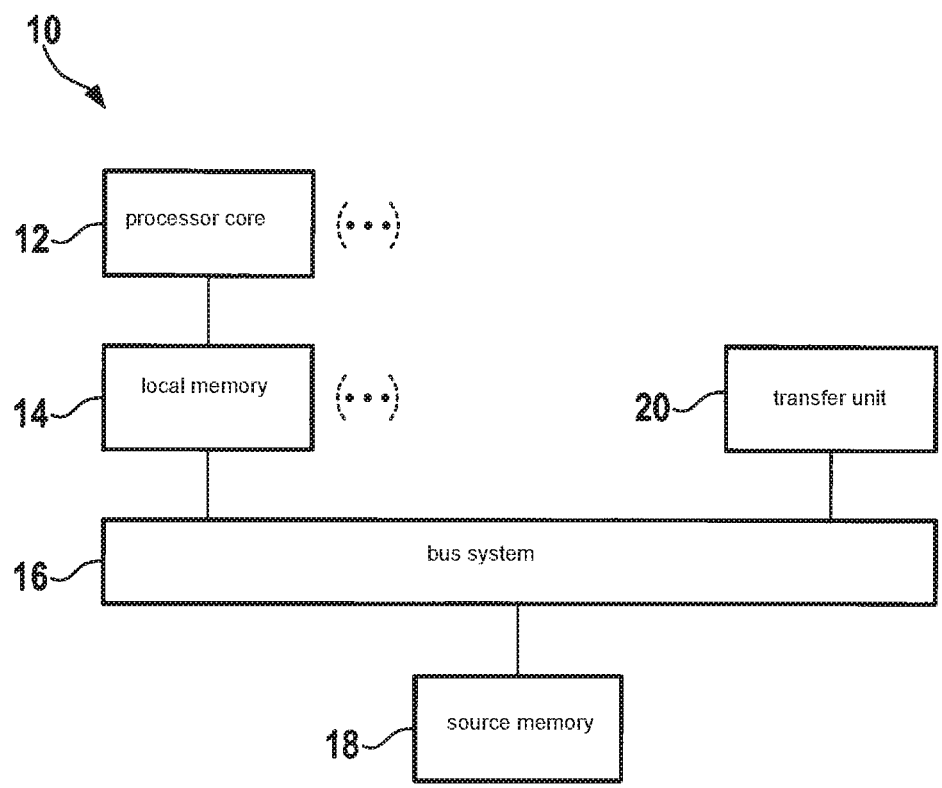
FIG. 1 is a simplified block diagram including a representation of a processing unit according to an example embodiment of the present invention.

FIG. 1 shows a block diagram that includes a processing unit 10, including in the present case at least one processor core 12. Processor core 12 is connected to a local memory 14, the local memory 14 being connected to a bus system 16. In one preferred example embodiment, bus system 16 is a parallel bus system 16, including a plurality of data lines and address lines, as it is used, for example, in microcontrollers.

In this case, processing unit 10 is designed to execute a plurality of program functions 22 (see FIG. 2) of a computer program 24 (see FIG. 2) for processing unit 10 using the at least one processor core 12, processing unit 10 further being designed to carry out the following steps: ascertaining 102 (see FIG. 2 or 4) program instructions 26, in particular, all program instructions that belong to a program function 22, which is to be executed at a future execution point in time t1," t2," t3" (see FIG. 2); and providing 104 (see FIG. 2 or 4) ascertained program instructions 26 in local memory 14 before execution point in time t1," t2," t3." In one preferred example embodiment, ascertainment 102 takes place during a development time ("design time") of computer program 24 and/or of a program system that includes computer program 24. In this case, ascertainment 102 takes place preferably not via processing unit 10 but, for example, via a system 200 separate from processing unit 10, cf. FIG. 5 further below.

In an example embodiment, ascertainment 102 takes place during a runtime of computer program 24. In this case, ascertainment 102 can take place via separate system 200 and/or via processing unit 10 and/or via a processing unit 10' adjacent to and comparable to processing unit 10 (not depicted) or the like.

In an example embodiment, local memory 14 is a global working memory of processing unit 10 (FIG. 1) and/or a local working memory of the at least one processing core 12. The global working memory is designed, for example, so that it can be accessed by multiple processor cores 12 of processing unit 10.

In the present case, processing unit 10 includes a transfer unit 10, which is designed to execute provision 104 of ascertained program instructions 26 in that transfer unit 20 copies ascertained program instructions 26 from a source memory 18 into local memory 14. Source memory 18 is designed, for example, as a so-called "flash memory." Source memory 18 and transfer unit 20 are connected to bus system 16. Transfer unit 20 is explained in greater detail further below. Additional possible peripheral elements of processing unit 10 are not additionally depicted in FIG. 1.

In an example embodiment, transfer unit 20 is designed to signal to processing unit 10 and/or to processor core 12 provision 104 of ascertained program instructions 26 in local memory 14.

Local memory 14, for example, is an internal global memory of processing unit 10 and/or an external memory of processing unit 10 and/or a local memory 14 of processor core 12. Local memory 14, for example, is a RAM memory, a memory with random access.

Processing unit 10 according to FIG. 1, for example, is an element of a control and/or regulating unit (not depicted), as it is designed, for example, for a motor vehicle.

In an example embodiment of processing unit 10, at least one ring memory 14' (see FIG. 2) is provided in local memory 14 for providing ascertained program instructions 26, ring memory 14' being cyclically read from processing unit 10 for program execution, and ring memory 14' being cyclically written with additional ascertained and chronologically following program instructions 26 to such addresses of ring memory 14' that have already been read in the cycle from processing unit 10. For example, ring memory 14' is situated in an address space of local memory 14, at least one cyclically changeable pointer being provided in each case in order to access ring memory 14'. An exemplary embodiment thereof is shown in FIG. 2.

Figure 2:
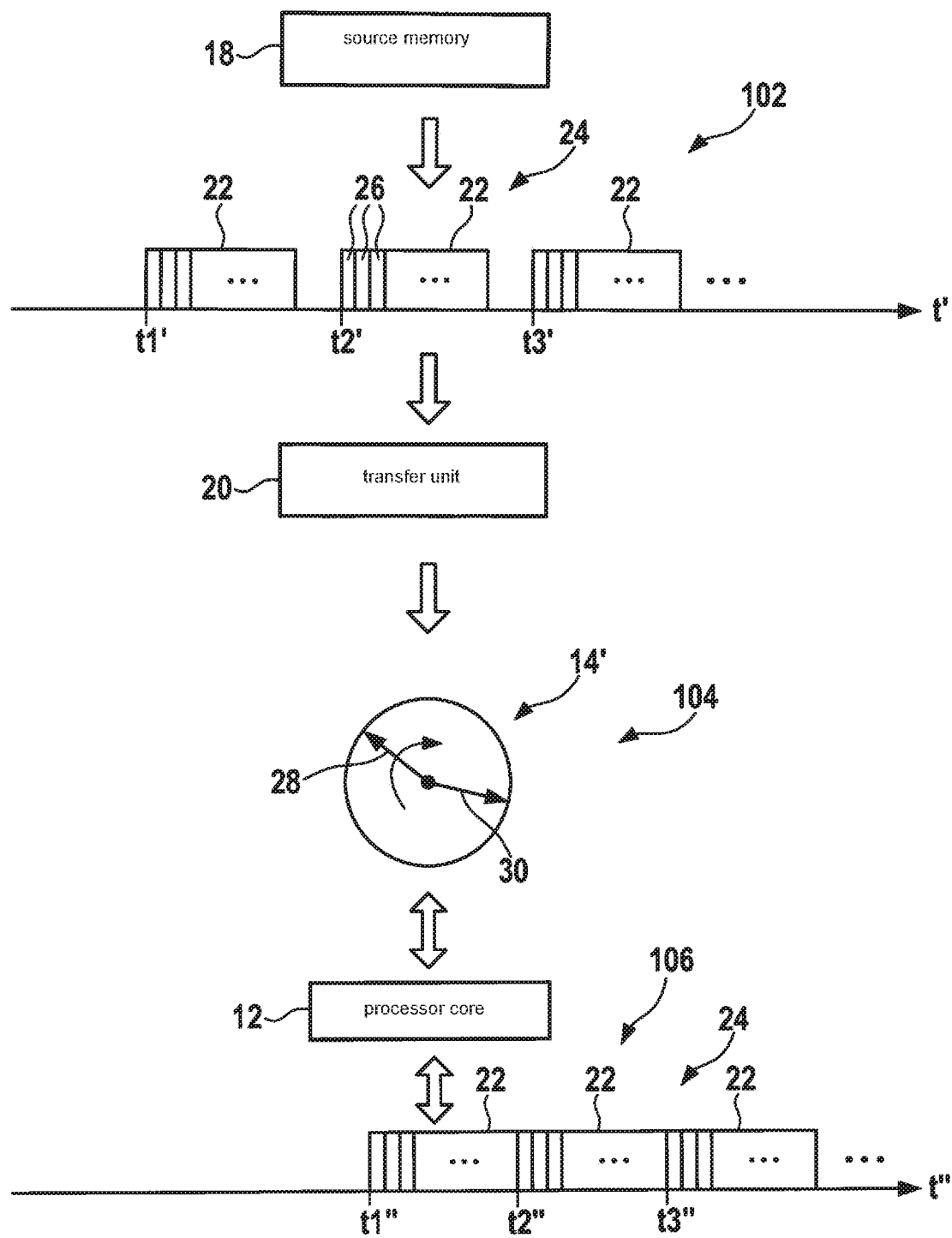
FIG. 2 is a schematic diagram illustrating providing program instructions in a local memory of the processing unit of FIG. 1, according to an example embodiment of the present invention.

FIG. 2 shows overall a schematic diagram for a sequence of program functions 22 of a computer program 24. Also shown in an upper section of FIG. 2 are source memory 18 and a first time axis t'. Program functions 22 each include one or multiple program instructions 26, which can be provided in local memory 14 using transfer unit 20.

As depicted, computer program 24 can include one or multiple program functions 22, and a respective program function 22 can include one or multiple program instructions 26. The "program function" can optionally be characterized by the term "runnable." Program functions 22 can include plannable program functions 22 and/or non-plannable program functions 22.

Also shown in FIG. 2 is an example embodiment of local memory 14, which in this case is or includes a ring memory 14'. Ring memory 14' is characterized, for example, by a predefinable memory space of fixed length in a RAM memory. Ring memory 14' includes a write pointer 28, which characterizes an instantaneous address, to which an instantaneously transmitted program instruction 26 can be written.

A read pointer 30 preferably controlled by processing unit 10 can follow spaced apart chronologically from write pointer 28 and thus feed respective program instruction 26 to a processing by processing unit 10 or processor core 12. Write pointer 28 and read pointer 30 can pass cyclically through the memory space assigned to ring memory 14'.

A second time axis t," which represents program functions 22 provided in local memory 14 or to be executed by processor core 12, is schematically shown in a lower section of FIG. 2. Second time axis t" also includes particular execution points in time t1," t2" and t3" which, due to the causality, fall chronologically after particular times t1', t2' and t3', which are shown on the upper first time axis t'.

Figure 3:
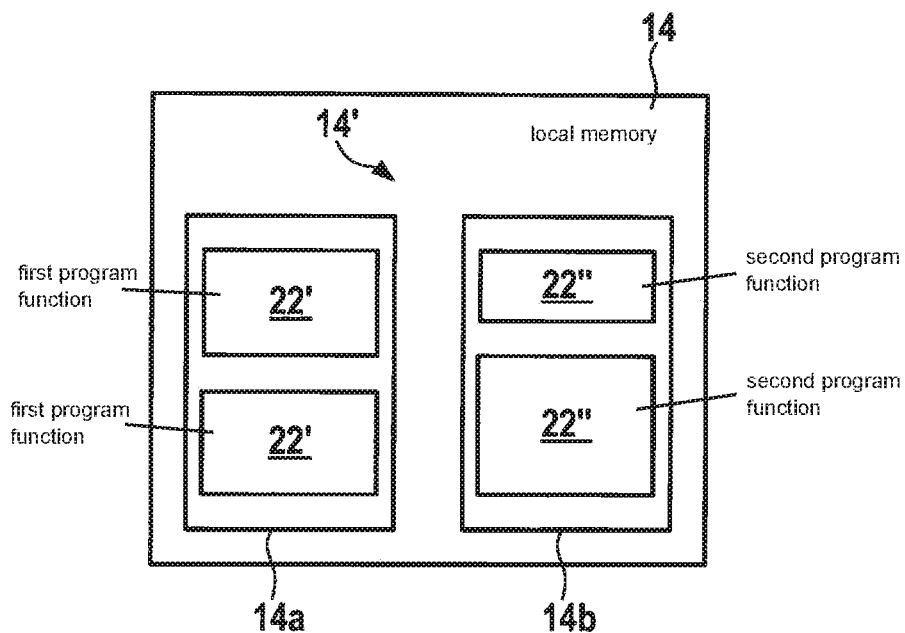
FIG. 3 shows a simplified schematic diagram, including of a local memory of the processing unit of FIG. 1, according to an example embodiment of the present invention.

FIG. 3 shows a simplified schematic diagram for local memory 14, which includes, for example, one ring memory 14' or multiple ring memories 14', see FIG. 2. In this case, a plurality (in the present case, two each) of first program functions 22' and second program functions 22" are to be provided and executed using local memory 14. First program functions 22', for example, have a cycle time (period) of 10 ms and second program functions 22" have a second cycle time of 1 ms. First program functions 22', for example, include address spaces of equal size relative to one another and second program functions 22" include address spaces of different size relative to one another.

As depicted in FIG. 3, first program functions 22' are preferably provided in a first memory space 14a of local memory 14 and second program functions 22" are provided in a second memory space 14b of local memory 14. This enables an efficient management of program functions 22' and 22" in local memory 14 and an efficient processing of respective program instructions 26 by processor core 12 of processing unit 10.

A method for operating processing unit 10 is subsequently described further below using FIGS. 1-3 and with reference to FIG. 4, processing unit 10 including at least one processor core 12 and a local memory 14 with respect to processing unit 10, and a plurality of program functions 22 of a computer program 24 for processing unit 10 being executed using the at least one processor core 12, characterized by the following steps: ascertaining 102 program instructions 26, in particular, all program instructions 26 that belong to a program function 22, which is to be executed at a future execution point in time t1," t2," t3"; and providing 104 ascertained program instructions 26 in local memory 14, respectively, 14a, 14b, 14', before execution point in time t1," t2," t3."

As previously described above in FIG. 1, ascertainment 102 of program instructions 26 can preferably (but not necessarily) take place separately from provision 104 of ascertained program instructions 26.

Local memory 14, for example, is an internal global memory of processing unit 10 and/or an external memory of processing unit 10 and/or a local memory 14 of processor core 12. Local memory 14, for example, is a RAM memory, memory with random access.

In an example embodiment, ascertained program instructions 26 are provided in local memory 14 of processing unit 10 in a sequence as a function of program function 22 to be executed.

In an example embodiment, for multiple different program functions 22, all program instructions 26 that belong to relevant program function 22 are provided in each case in local memory 14 before the respective execution point in time t1," t2," t3."

In an example embodiment, provision 104 of ascertained program instructions 26 takes place in that transfer unit 20, preferably independent of processing unit 10, copies ascertained program instructions 26 from source memory 18 into local memory 14.

In an example embodiment, transfer unit 20 includes an additional processing unit 10 and/or an additional processor core 12 of processing unit 10, and/or a direct memory access control unit, which is able to carry out direct memory accesses via bus system 16 in a manner known per se.

In one preferred example embodiment, transfer unit 20 and the direct memory access control unit are designed as pure hardware circuitry. The direct memory access control unit is also referred to as "DMA controller." Alternatively, the direct memory access control unit can be implemented using software or using a mix of hardware and software. In an example embodiment, transfer unit 20 is designed as special (user-specific) hardware circuitry. See also in this regard FIGS. 5 and 7 further below.

Figure 4:
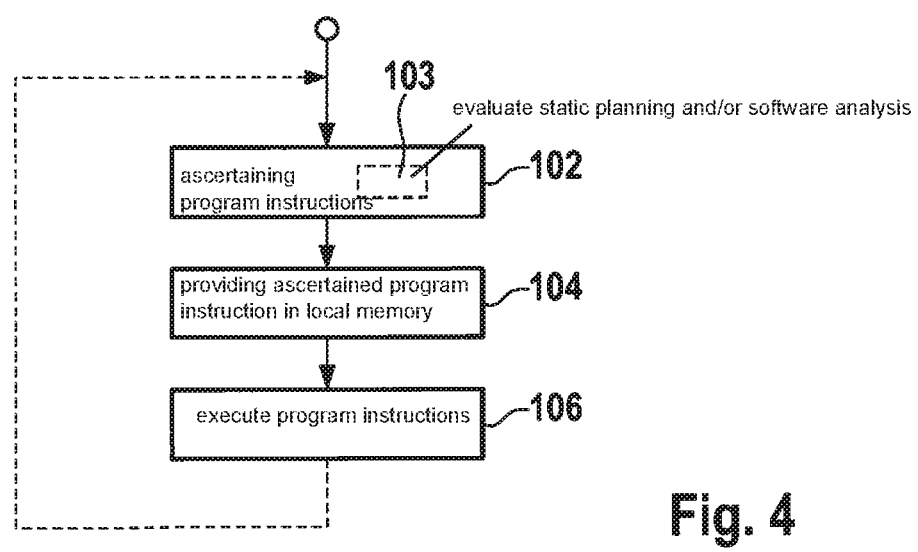
FIG. 4 is a flowchart of a method for operating the processing unit, according to an example embodiment of the present invention.

FIG. 4 is a flowchart of a method for operating processing unit 10 according to one or to multiple of FIGS. 1-3. Ascertainment 102 preferably of all program instructions 26 that belong to a program function 22, which is to be executed at a future execution point in time t1," t2," t3," takes place in a first block.

In an example embodiment, ascertainment 102 includes: evaluation 103 of a preferably static planning of a periodic execution of program functions 22, and/or a software analysis of at least one part of computer program 24. Thus, it is possible to advantageously ascertain from the number of program functions 22 to be executed during an upcoming time span, in each case, program functions 22 regularly to be executed, using a static planning using linear lists of program functions 22 and/or to ascertain other program functions 22 to be executed using an analysis, in particular, a software analysis.

In a subsequent block, provision 104 of ascertained program instructions 26 takes place in local memory 14 before execution point in time t1," t2," t3." In a subsequent block, an execution 106 of provided program functions 22 or program instructions 26 takes place using processor core 12 at particular execution point in time t1," t2," t3" using local memory 14. A dashed line branches out behind block 106 at the start of block 102 and symbolizes that the method shown in FIG. 4 can accordingly be continued cyclically or continuously.

In another variant of the present invention, it is also conceivable to organize local memory 14 differently than in the form of a ring memory 14'.

The application of the principle according to the present invention advantageously enables an avoidance of so-called instruction stalls and thus a more efficient utilization of process time resources of a processing unit 10, even if a comparatively slow code memory 18 is provided.

Figure 5:
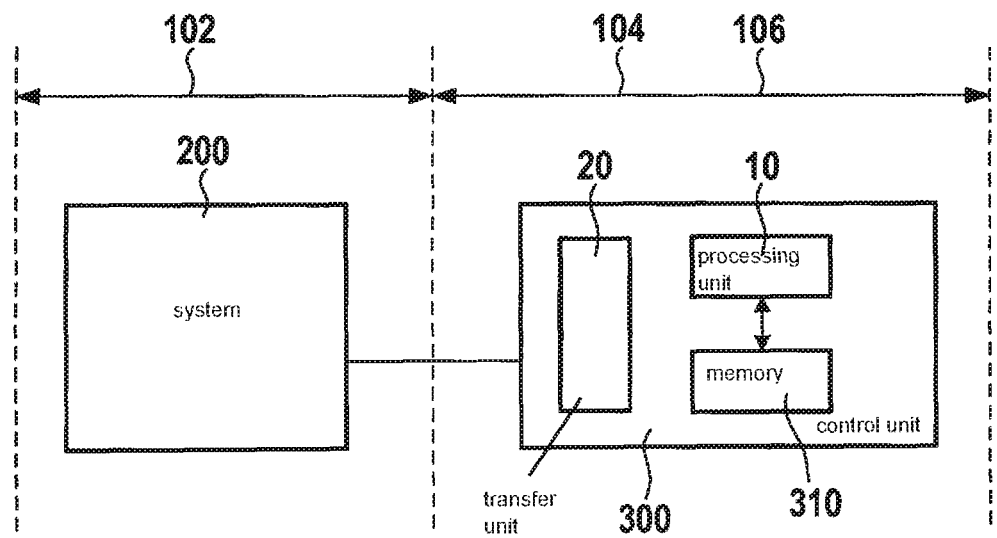
FIG. 5 is a schematic diagram, including of a system for ascertaining program instructions, as well as a control unit that includes a processing unit, according to an example embodiment of the present invention.

FIG. 5 shows a system 200 (to the left in FIG. 5) for ascertainment 102 of program instructions 26, in particular, of all program instructions 26 that belong to a program function 22 of computer program 24, which program function 22 is to be executed at a future execution point in time t1," t2," t3," system 200 being designed to carry out ascertainment 102 of program instructions 26 chronologically prior to a runtime of computer program 24, in particular, at a development time of computer program 24 and/or of a program system that includes computer program 24.

A control unit 300 that includes processing unit 10 and transfer unit 20, which is a control unit 300 for a motor vehicle, for example, is shown to the right in FIG. 5. Plotted above system 200 and control unit 300 is, in each case, a horizontal double arrow, which is identified in each case with the reference numeral for ascertainment 102 of program instructions 26, and for provision 104 and execution 106 of program instructions 26.

In the present case, program instructions 26 ascertained in system 200 and/or pieces of information characterizing them can be saved in a memory 310 of control unit 300. In an example embodiment, memory 310 is a buffer memory, from which program instructions 26 can be written into local memory 14 or into ring memory 14' during a runtime of computer program 24. In an example embodiment, memory 310 is identical to local memory 14 or to ring memory 14'.

In an example embodiment not depicted, system 200 is integrated into control unit 300 or into processing unit 10. In this case, system 200 is designed using hardware and/or using software executable in control unit 300.

Alternatively, system 200 is separate from processing unit 10 or from control unit 300, and is, for example, part of a development environment for computer programs 24 for processing unit 10. System 200 can also be designed, for example, to carry out the following steps: evaluating a preferably static planning of a periodic execution of program functions 22, and/or a software analysis of at least one part of computer program 24, these steps being capable, for example, of being carried out also within system 200, in particular, even before computer program 24 is provided to processing unit 10 for execution.

Figure 6:
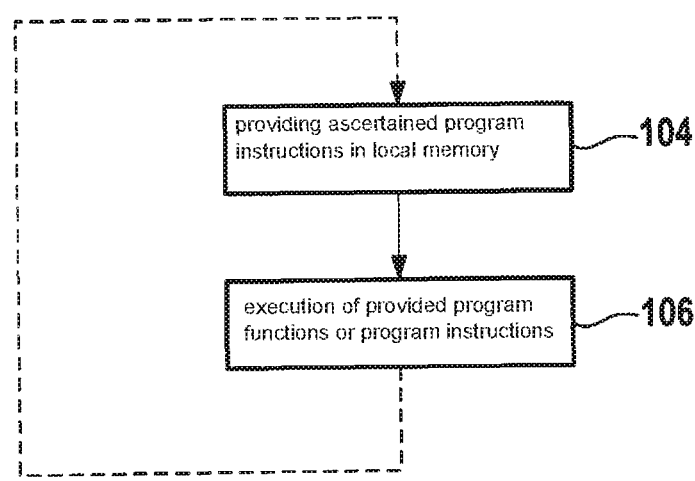
FIG. 6 is a flowchart of a method for operating the processing unit, according to an example embodiment of the present invention.

FIG. 6 is a flowchart of a method for operating processing unit 10. The flowchart can preferably, but not necessarily, be executed in conjunction with the configuration of FIG. 5. Ascertainment 102 of program instructions 26 takes place in a first step (not depicted) before a runtime of computer program 24 or before an implementation of the flowchart shown in FIG. 6. Ascertainment 102 preferably takes place at a development time of computer program 24 and/or of a program system that includes computer program 24.

In a second step, provision 104 of ascertained program instructions 26, as well as execution 106 of provided program functions 22 or program instructions 26 takes place using processor core 12 during a runtime of computer program 24, as this has been described further above in FIG. 4. A dashed line from one end of block 106 to a start of block 104 symbolizes that the method shown in FIG. 6 can be continued cyclically or continuously accordingly.

FIG. 7 shows a schematic diagram similar to FIG. 5. In the present case, bus system 16 is connected to processing unit 10, to memory 310, to source memory 18, to transfer unit 20, and to an interface circuit 320. Interface circuit 320 is connected to system 200. In an example embodiment, transfer unit 20 is connected directly to source memory 18 and/or to interface circuit 320 and or to local memory 14 and 14' using data lines and/or control lines. This is depicted in FIG. 7 in each case by dashed connecting lines.

Transfer unit 20 is designed to copy program instructions 26, in particular all program instructions 26 that belong to a program function 22, which is to be executed at a future execution point in time t1," t2," t3," via a unit preferably independent of transfer unit 20 (i.e., system 200 in the present case) from source memory 18 into local memory 14 and 14'.

In an example embodiment, program instructions 26 have been ascertained using evaluation 103 of a, preferably static, planning of a periodic execution of program functions 22, and/or of a software analysis of at least one part of computer program 24.

Corresponding (configuration) data, which specify, for example, for at least one program function 22 of computer program 24, which program instructions 26 all belong to related program function 22, can be provided to the transfer unit before the execution of the computer program in the processing unit or also dynamically, i.e., during the execution of the computer program in the processing unit. Such data can, for example, be reserved as an addition to the computer program, or also separately therefrom. These data can contain, in particular, information about a cyclical execution of program functions 22, as already mentioned above, so that transfer unit 20 can ascertain from the data up to which future point in time program instructions 26 from one or from multiple program functions 22 of interest for the processing unit, are to be provided, for example, in its local memory.

If a transfer unit is not provided in other example embodiments, the aforementioned functionality, which relates to the use of the (configuration) data, can also be implemented by the processing unit itself.

What is claimed is:

1. A method for operating a processing unit, the processing unit including a local memory of the processing unit and at least one processor core configured to execute a plurality of program functions of a computer program, the method comprising:
   for each of one or more of the plurality of program functions to be executed at a respective future execution point in time;
      prior to a runtime of the computer program, ascertaining respective program instructions that belong to the respective program function; and
      copying the respective ascertained program instructions from a source memory into the local memory before the respective execution point in time, the respective ascertained program instructions being sequentially copied from the source memory into the local memory in a sequential order in which the processing unit is to sequentially execute the respective ascertained program instructions;
   wherein:
      the local memory includes at least one ring memory from which the ascertained program instructions are retrievable for execution at the respective execution point in time; and
      the method further comprises:
         the processing unit cyclically reading the ring memory for execution of the program; and
         cyclically writing additional ascertained and chronologically following program instructions to addresses of the ring memory that have already been read in the cyclical reading.

2. The method of claim 1, wherein the one or more of the plurality of program functions are more than one of the plurality of program functions.

3. The method of claim 1, wherein the local memory is a global working memory of the processing unit.

4. The method of claim 1, wherein the local memory is local to one of the at least one processor core.

5. The method of claim 1, wherein the copying of the ascertained program instructions from the source memory into the local memory of the processing unit is performed by a transfer unit.

6. The method of claim 5, wherein the transfer unit includes an additional processor core of the processing unit.

7. The method of claim 5, wherein the transfer unit includes a direct memory access control unit.

8. The method of claim 5, wherein the transfer unit is separate from the processing unit.

9. The method of claim 8, wherein the transfer unit includes an additional processing unit.

10. The method of claim 2, wherein the ascertaining includes evaluating a static planning of a periodic execution of the program functions, and determining, based on the evaluating, a sequential execution order of the more than one of the plurality of program functions, and wherein the respective program instructions of the more than one of the plurality of program functions are copied from the source memory to the local memory sequentially in the sequential execution order of the more than one of the plurality of program functions.

11. The method of claim 2, wherein the ascertaining includes a software analysis of at least one part of the computer program, and determining, based on the evaluating, a sequential execution order of the more than one of the plurality of program functions, and wherein the respective program instructions of the more than one of the plurality of program functions are copied from the source memory to the local memory sequentially in the sequential execution order of the more than one of the plurality of program functions.

12. The method of claim 1, wherein the providing occurs during the runtime of the computer program.

13. The method of claim 1, wherein the ascertaining is performed during development of the computer program or of a system including the computer program.

14. The method as recited in claim 1, further comprising:
   prior to the copying, ascertaining the sequential order in which the processing unit is to sequentially execute the respective ascertained program instructions.

15. A processing unit comprising:
   at least one processor core; and
   a local memory;
   wherein:
      the at least one processor core is configured to execute a plurality of program functions of a computer program; and
      the processing unit is configured to, for each of one or more of the plurality of program functions to be executed at a respective future execution point in time:
         prior to a runtime of the computer program, ascertain respective program instructions that belong to the respective program function; and
         copy the respective ascertained program instructions from a source memory into the local memory before the respective execution point in time, the respective ascertained program instructions being sequentially copied from the source memory into the local memory in a sequential order in which the processing unit is to sequentially execute the respective ascertained program instructions;
   wherein:
      the local memory includes at least one ring memory from which the ascertained program instructions are retrievable for execution at the respective execution point in time; and
      the processing unit is further configured to:
         cyclically read the ring memory for execution of the program; and cyclically write additional ascertained and chronologically following program instructions to addresses of the ring memory that have already been read in the cyclical reading.

16. The processing unit of claim 15, wherein the local memory is a global working memory of the processing unit or a local working memory of the at least one processor core.

17. The processing unit of claim 15, wherein:
the processing unit includes a transfer unit;
the transfer unit is configured to execute the copying of the ascertained program instructions from the source memory into the local memory.

18. The processing unit of claim 17, wherein the transfer unit is configured to signal to the processing unit or to the processor core the provision of the ascertained program instructions in the memory.

19. A control unit of a motor vehicle comprising a processing unit, wherein:
the processing unit includes:
at least one processor core; and
a local memory;
the at least one processor core is configured to execute a plurality of program functions of a computer program; and
the processing unit is configured to, for each of one or more of the plurality of program functions to be executed at a respective future execution point in time:
prior to a runtime of the computer program, ascertain respective program instructions that belong to the respective program function; and
copy the respective ascertained program instructions from a source memory into the local memory before the respective execution point in time, the respective ascertained program instructions being sequentially copied from the source memory into the local memory in a sequential order in which the processing unit is to sequentially execute the respective ascertained program instructions;
wherein:
the local memory includes at least one ring memory from which the ascertained program instructions are retrievable for execution at the respective execution point in time; and
the processing unit is further configured to:
cyclically read the ring memory for execution of the program; and
cyclically write additional ascertained and chronologically following program instructions to addresses of the ring memory that have already been read in the cyclical reading.

20. A transfer unit for a processing unit, wherein:
the processing unit includes at least one processor core and a local memory;
the at least one processor core is configured to execute a plurality of program functions of a computer program; and
for each of more than one of the plurality of program functions to be executed at a respective future execution point in time, the transfer unit is configured to, prior to a runtime of the computer program, copy respective ascertained program instructions that belong to the respective program function from a source memory into the local memory of the processing unit, the copying by the transfer unit includes copying the respective ascertained program instructions of the more than one of the plurality of program function from the source memory into the local memory sequentially in a sequential order in which the processing unit is to sequentially execute the more than one of the plurality of program functions;
wherein:
the local memory includes at least one ring memory from which the ascertained program instructions are retrievable for execution at the respective execution point in time; and
the processing unit is configured to cyclically read the ring memory for execution of the program; and
the transfer unit is configured to cyclically write additional ascertained and chronologically following program instructions to addresses of the ring memory that have already been read in the cyclical reading.

21. The transfer unit of claim 20, wherein the ascertainment of the program instructions is performed by an evaluation of a static planning of a periodic execution of the program functions or by a software analysis of at least one part of the computer program.

22. A method for operating a processing unit, the processing unit including a local memory of the processing unit and at least one processor core configured to execute a plurality of program functions of a computer program, the method comprising:
for each of more than one of the plurality of program functions to be executed at a respective future execution point in time;
prior to a runtime of the computer program, ascertaining respective program instructions that belong to the respective program function; and
copying the respective ascertained program instructions from a source memory to the local memory before the respective execution point in time, the respective ascertained program instructions of the more than one of the plurality of program functions being copied sequentially from the source memory into the local memory in a sequential order in which the processing unit is to sequentially execute the program functions;
wherein:
the local memory includes at least one ring memory from which the ascertained program instructions are retrievable for execution at the respective execution point in time; and
the method further comprises:
the processing unit cyclically reading the ring memory for execution of the program; and
cyclically writing additional ascertained and chronologically following program instructions to addresses of the ring memory that have already been read in the cyclical reading.

23. The method of claim 22, wherein the sequential order in which the processing unit sequentially executes the more than one program function of the plurality of function is ascertained prior to the runtime of the computer program based on an evaluation of a static planning of a periodic execution of the program functions.

24. The method of claim 22, wherein the sequential order in which the processing unit sequentially executes the more than one program function of the plurality of function is ascertained prior to the runtime of the computer program based on a software analysis of at least one part of the computer program.

* * * * *